Oct. 29, 1946.  L. C. CHOUINGS  2,410,269
LIQUID PRESSURE SERVO-MOTOR DEVICE
Filed June 9, 1945
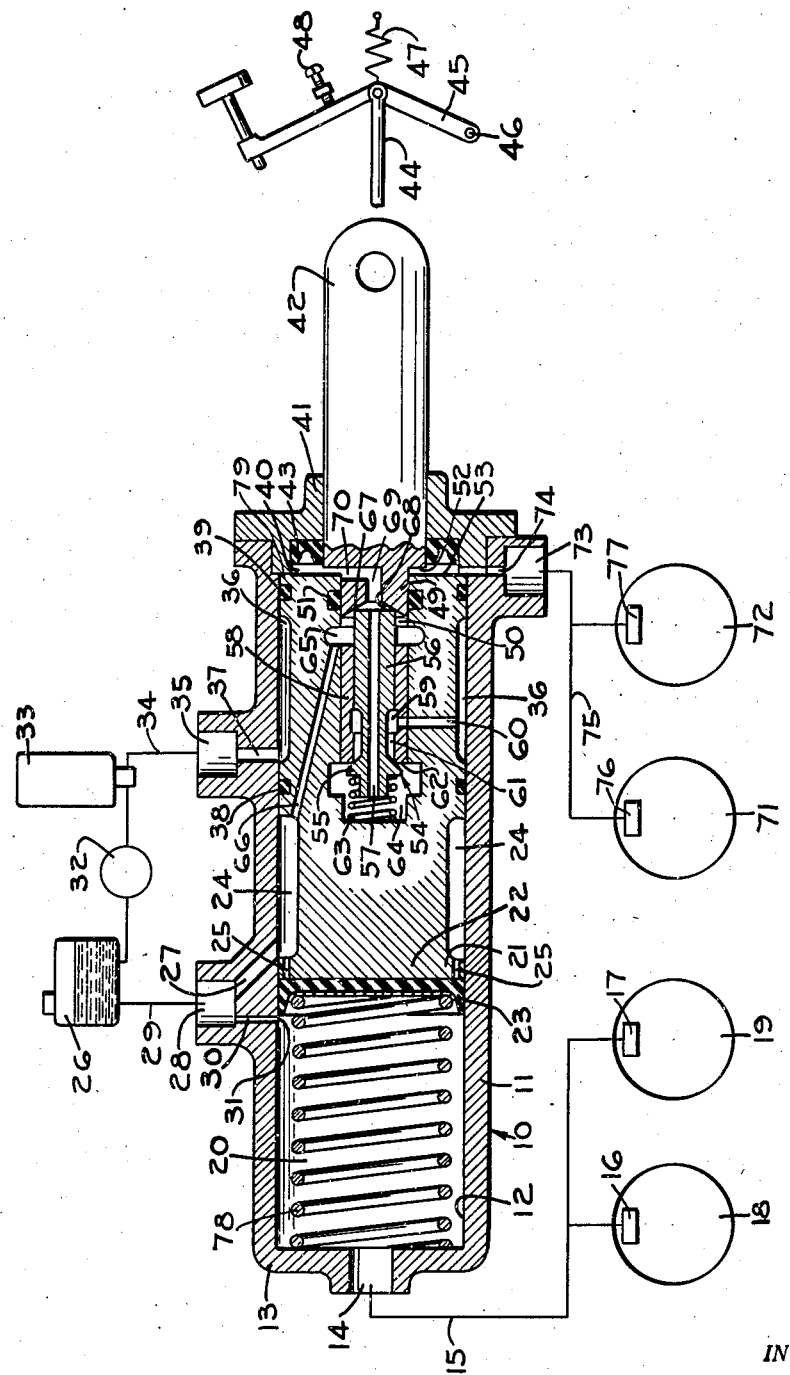
INVENTOR.
LESLIE CYRIL CHOUINGS
BY
Cecil F. Arens
ATTORNEY Patented Oct. 29, 1946

2,410,269

UNITED STATES PATENT OFFICE 2,410,269

LIQUID PRESSURE SERVOMOTOR DEVICE

Leslie Cyril Chouings, Leamington Spa, England, assignor to Automotive Products Company Limited, Leamington Spa, England Application June 9, 1945, Serial No. 598,481
In Great Britain April 28, 1944

3 Claims. (Cl. 60—54.6)

This invention relates to liquid pressure servomotors of the kind comprising a plunger and cylinder motor unit the working space of which is fed with pressure liquid from a hydraulic accumulator or like source through a valve having a hunting or follow-up action, the valve being arranged to be actuated in opposite directions to place the working space into communication with a source of pressure liquid or with an exhaust outlet respectively, and the resulting operation of the motor unit acting to move the valve back to its normal intermediate position.

It is the object of the invention to provide a liquid pressure servo-motor device, which is simple in construction but which operates in a very reliable and efficient manner. A further object of the invention is to provide a simple, robust and compact form of combined servo-motor and master cylinder unit suitable for the hydraulic operation of vehicle brakes by power stored in a liquid pressure accumulator.

According to the invention a liquid pressure servo-motor comprises a cylinder, a plunger movable in the cylinder, a valve chamber in the plunger, a thrust member which projects into the valve chamber and is movable axially relative to the plunger, and a valve device in the valve chamber comprising a valve member balanced with respect to the inlet pressure acting upon it and arranged to control the connection of a working space in the cylinder to the inlet for pressure liquid and to an exhaust outlet, characterised by the fact that the pressure in the working space acts in reverse directions on the plunger and thrust member respectively.

There is further provided according to the invention a liquid pressure servo-motor comprising a cylinder, a plunger movable in the cylinder, a valve chamber in the plunger, a thrust member which projects into the valve chamber and is movable axially relative to the plunger, and a valve device in the valve chamber comprising a valve member balanced with respect to the inlet pressure acting upon it and arranged to control the connection of a working space in the cylinder to the inlet for pressure liquid and to an exhaust outlet, characterised by the fact that the pressure in the working space acts in reverse directions on the plunger and thrust member respectively and the area of the thrust member on which the pressure in the working space acts is less than the corresponding area of the plunger, so that the thrust member receives a thrust due to the said pressure less than, but proportional to, that received by the plunger.

Preferably the valve comprises a poppet valve member with a longitudinal passage extending from end to end, the valve member being disposed with its head pointing away from the working space so that the pressure liquid admitted past said head flows through the longitudinal passage to the working space, the thrust member conveniently being arranged to engage with the end of the stem portion of the poppet valve member to urge the head of the latter off its seating. The plunger of the servo-motor may be integral with or directly attached to the piston of a liquid pressure master cylinder for applying hydraulic wheel brakes or the like. Thus the plunger may be formed with a circumferential groove producing an annular chamber which is in permanent connection with a reservoir, said annular chamber serving as the exhaust outlet of the servo-motor valve and also for maintaining the wheel brakes or equivalent fully charged with liquid during retracting movement of the servo-motor plunger.

The thrust member may be slidable within the plunger and have an abutment surface arranged to transmit thrust from the thrust member to the plunger in the event of failure in the supply of pressure liquid to the servo-motor.

The invention is illustrated by way of example in the accompanying drawing, which is a diagrammatic sectional elevation of a combined servo-motor and master cylinder unit, the operating pedal lever, the brake assemblies and the associated parts of a typical hydraulic system being shown to a considerably reduced scale.

The combined servo-motor and master cylinder unit is indicated generally at 10 and comprises a cylinder barrel 11, which is formed with a bore 12, the latter being closed at one end by an end wall 13, while a connection 14 in the end wall 13 leads by a pipe 15 to the motor units 16 and 17 of a pair of brakes 18 and 19 belonging, say, to the rear wheels (not shown) of a motor vehicle. The left-hand part of the bore 12 encloses a master cylinder working space 20, which latter is bounded by the head 21 of a plunger member 22 slidable within the bore 12, said head being fitted with a resilient packing cup 23; the lip portion of the packing cup 23 is arranged to act in the usual manner as a non-return valve, and enables liquid to flow freely from a circumferential groove 24 to the left, past the head 21 (say through passages 25) into the working space 20, but prevents flow in the opposite direction. The plunger member 22 is urged to the right by a coiled compression spring 78 and when said plunger member 22 is fully retracted, its right-hand end engages a shoulder 79 formed upon a gland member 41. The circumferential groove 24 communicates permanently with a liquid reservoir 26 by way of an oblique passage 27, an exhaust outlet connection 28 and a pipe 29. A breathing passage 30 leads in the usual manner from the exhaust outlet connection 28 to a small port 31 disposed in the bore 12 at a position just in front of the packing cup 23 when the latter is in its fully retracted position; thus when the plunger member 22 is in its fully retracted position, the master cylinder working space 20 communicates with the reservoir 26 through the passage 30, but this passage is closed by the initial advancing movement of the plunger 22, thereby enabling pressure to be generated in the working space 20 for applying the brakes 18 and 19.

The reservoir 26 also feeds liquid to a pump 32, which is constantly driven for the purpose of maintaining a hydraulic accumulator 33 in a fully charged condition, the pump 32 being provided in the usual manner with a suitable form of pressure relief or by-pass valve device (not shown). The outlet pipe from the accumulator 33 is indicated at 34 and leads to a pressure inlet connection 35 on the cylinder 11. At its right-hand part the plunger member 22 has a second circumferential groove 36 forming an annular space which is always in communication with the pressure inlet 35 by way of a passage 37, irrespective of the position occupied by the plunger member 22 within the cylinder bore 12. A packing ring 38 isolates the groove 36 from the groove 24, while a second packing ring 39 at the right-hand end of the plunger member 22 seals the groove 36 from a servo-motor working space 40 in the right-hand end of the cylinder 11. This end of the cylinder is fitted with the gland member 41 receiving an axially slidable thrust member 42, which passes through an annular packing cup 43 of U-shape in radial section. At its outer end the thrust member 42 is connected, as by a link indicated at 44, with suitable actuating means, such as a pedal lever 45, said lever being pivotally mounted at 46 and being provided with a return spring 47 and an adjustable stop 48.

The left-hand end of the thrust member 42, where it projects into the servo-motor working space 40, is formed with a reduced diameter 49, which extends slidably within a bore 50 formed in the plunger member 22, a packing ring 51 being provided to prevent leakage of liquid along the sliding surfaces. At the base of the reduced diameter 49 the thrust member has a shoulder 52 serving as an abutment surface, which is adapted when necessary to bear against the right-hand end surface 53 of the plunger member 22 so as to transmit force from the thrust member 42 directly to the plunger member 22. The plunger member 22 is, however, normally operated by liquid pressure within the working space 40, and for this purpose a valve device of the hunting or follow-up type, indicated generally at 54, is provided within the plunger member 22 and is adapted to operate in conjunction with the thrust member 42. The valve device 54 comprises a poppet valve member having a frusto-conical head 55 formed upon a stem portion 56, this valve member 55, 56 having a longitudinal passage 57 extending from end to end. The stem 56 is freely slidable in a substantially liquid-tight manner within a sleeve 58 fast within an extension of the bore 50, said sleeve being formed internally with a circumferential groove 59 communicating with the circumferential groove 36 by means of a radial passage 60. In register with the groove 59 the stem portion 56 is reduced in diameter to form an annular space 61, which is bounded at its left-hand side by the frusto-conical surface of the head 55. This surface is arranged to engage with an annular seating 62 constituted by the left-hand end of the bore of the sleeve 58, and it will be seen that when the valve member 55, 56 is in its right-hand or closed position, it is balanced with respect to the pressure liquid in the annular space 61; the valve member 55, 56 is normally retained in this seated position by a light coiled compression spring 63 disposed within a valve chamber 64 at the inner end of the bore 50. The right-hand end of the stem 56 is arranged to extend beyond the sleeve 58 and the space 65 surrounding it is connected with the reservoir 26 by way of a passage 66 leading into the circumferential groove 24. The outer edge 67 at the extremity of the stem 56 forms a seat for engagement by the surface of a frusto-conical recess 68 in the end of the reduced diameter 49, said spigot having an axial passage 69 leading by way of a radial passage 70 into the servo-motor working space 40; it follows, therefore, that when the reduced diameter 49 is out of engagement with the stem 56, as is shown in the drawing, the servo-motor working space 40 is in free communication with the reservoir 26, whereas advancing movement of the thrust member 42 towards the left causes the surface 68 to engage the seat 67, thus isolating the working space 40 from the reservoir 26.

In a motor vehicle braking system it is convenient to operate the front wheel brakes, indicated at 71 and 72, directly by the pressure liquid from the pump 32, and for this purpose the cylinder 11 is formed with an auxiliary connection 73 leading from the servo-motor working space 40 by way of a passage 74, said connection 73 being coupled by a pipe 75 with the motor units 76 and 77 of the two front wheel brakes 71 and 72 respectively.

The operation of the servo-motor device is as follows. With the brakes released the parts are disposed in the positions shown, the reduced diameter 49 of the thurst member 42 being free from the valve stem 56, while the head 55 is seated at 62 so as to prevent the escape of pressure liquid from the accumulator 33. As above mentioned, the servo-motor working space 40 (and therefore the front brake motor units 76 and 77 with their pipe 75) communicates freely with the reservoir 26 by way of the space 65, the passage 66, the groove 24, passage 27, connection 28 and pipe 29. The plunger member 22 is, of course, urged to its right-hand or fully retracted position by the compression spring 78. When the pedal lever 45 is actuated to apply the brakes, the thrust member 42 is moved to the left, thus bringing the recess 68 into engagement with the seat 67 on the valve stem 56 and cutting off the servo-motor working space 40 from the reservoir 26. Further movement of the thrust member 42 consequently causes the stem 56 to slide within the sleeve 58, shifting the head 55 away from the seat 62, so that pressure liquid from the accumulator 33 can flow from the annular space 61 into the valve chamber 64, said liquid then passing along the passage 57 in the valve member and into the servo-motor working space 40 by way of the passages 69 and 70. The pressure liquid is therefore able to act upon the annular end surface 53 of the plunger member 22 so as to force said plunger member to the left, thus expelling working liquid under pressure from the cylinder space 20 to the rear brakes 18 and 19. At the same time the rise in pressure within the servo-motor working space 40 is communicated by the pipe 75 to the motor units 76 and 77 for applying the front brakes 71 and 72. It will be seen that the distance through which the plunger member 22 moves along the cylinder 11 will depend upon the movement which is imparted manually to the thrust member 42, for the sleeve 58 moves with the plunger member 22 and therefore causes the seat 62 to be brought into re-engagement with the head 55 to shut off the supply of pressure liquid from the servo-motor working space 40. The valve member 55, 56 therefore has a hunting or follow-up action, and to produce any given movement of the plunger member 22 the thrust member 42 must be advanced by a substantially equal distance. The improved servo-motor has the advantage that the liquid pressure which is operative within the servo-motor working space 40 reacts upon the thrust member 42 and thus gives the requisite "feel" to enable the operator of the pedal lever 45 to obtain, by the resistance encountered, an accurate indication of the force which is being applied to the brakes. This, of course, is due to the fact that the pressure within the working space 40 acts upon the annular surface 52 of the thrust member 42; the resulting force on the thrust member 42 is, of course, relatively small by comparison with the force exerted by the liquid pressure on the plunger member 22, these two forces being substantially proportional respectively to the areas of the annular surfaces 52 and 53. As the brakes are released by reducing the operating pressure on the pedal lever 45, the recess 68 departs from the valve stem 56, thus providing an opening past the seat 67 and enabling working liquid to escape from the servo-motor working space 40 as well as from the front brake motor units 76 and 77. When the pedal lever 45 eventually re-engages the stop 48, the thrust member 42 is disposed in a position where the recess 68 is held away from the valve stem 56, the valve head 55 being, of course, seated at 62 and the plunger member 22 being in its extreme right-hand position.

In the event of a failure in the supply of pressure liquid from the accumulator 33, actuation of the pedal lever 45 causes the shoulder 52 of the thrust member 42 to engage directly with the plunger member 22, so that the latter is advanced directly by the pedal lever 45 to create liquid pressure within the working space 20, thus applying the rear brakes 16, 17.

It will be understood that the construction of servo-motor which has been described is given merely by way of example and that various modifications are possible in the arrangement of the parts. For instance, the plunger member 22 could in some cases be connected mechanically with one or more brakes of the system instead of, or in addition to, being used for creating hydraulic pressure within the working space 20.

What I claim is:

1. A liquid pressure servo-motor comprising a cylinder, a plunger movable in the cylinder and normally urged toward one end thereof and dividing the same into two working spaces one at each end of the cylinder, said plunger having a valve chamber therein, a valve device disposed in the valve chamber, an inlet port having a connection to said valve chamber which is normally closed to the inlet port by said valve device, an exhaust port having a passageway communicating with the working space in one end of the cylinder, a passage communicating said valve chamber with the working space in said one end of the cylinder, said valve device including a valve member constituted to be hydraulically balanced at all times with respect to inlet pressure acting upon it and constructed and arranged to be moved in a direction to open said normally closed connection to said valve chamber to admit inlet pressure thereto and to said one end of the cylinder to move the plunger toward the other end of the cylinder, a thrust member having one end projecting into the working space in said one end of the cylinder and movable axially relative to the plunger and constructed and arranged to engage said valve member to move the same to open the valve chamber to inlet pressure and to close said exhaust port passageway to cut off communication between said one end of the cylinder and said exhaust port, said thrust member and plunger constructed and arranged to have areas exposed to the working space in said one end of the cylinder in such relationship that the total pressure acting on the effective area of the thrust member tending to move it in one direction is only a fraction of but proportional to the total pressure acting on the effective area of the plunger tending to move it in the opposite direction toward said other end of the cylinder, said plunger comprising a piston integral therewith and arranged to put liquid under pressure in the working space in said other end of the cylinder, the plunger being formed with a circumferential groove providing an annular chamber having a permanent connection with the exhaust port, and means for bypassing fluid from the annular chamber to the working space in said other end of the cylinder during movement of the piston to said one end of the cylinder, said annular chamber serving as a liquid supply chamber for maintaining the working space in said other end of the cylinder fully charged with liquid during movement of the plunger toward the aforesaid one end of the cylinder.

2. A liquid pressure servo-motor comprising a cylinder, a plunger movable in the cylinder and normally urged toward one end thereof and dividing the same into two working spaces one at each end of the cylinder, said plunger having a valve chamber therein, a valve device disposed in the valve chamber, an inlet port having a connection to said valve chamber which is normally closed to the inlet port by said valve device, an exhaust port having a passageway communicating with the working space in one end of the cylinder, said valve device including a valve member constituted to be hydraulically balanced at all times with respect to inlet pressure acting upon it and constructed and arranged to be moved in a direction to open said normally closed connection to said valve chamber to admit inlet pressure thereto and to said one end of the cylinder to move the plunger toward the other end of the cylinder, a thrust member having one end projecting into the working space in said one end of the cylinder and movable axially relative to the plunger and constructed and arranged to engage said valve member to move the same to open the valve chamber to inlet pressure and to close said exhaust port passageway to cut off communication between said one end of the cylinder and said exhaust port, said thrust member and plunger constructed and arranged to have areas exposed to the working space in said one end of the cylinder in such relationship that the total pressure acting on the effective area of the thrust member tending to move it in one direction is only a fraction of but proportional to the total pressure acting on the effective area of the plunger tending to move it in the opposite direction toward said other end of the cylinder, said valve member comprising a poppet valve head with a valve stem having a longitudinal passage therein extending from end to end to thereby connect said valve chamber to the working space in said one end of the cylinder, the valve member being disposed with the poppet valve head pointing away from the working space in said one end of the cylinder so that the pressure liquid admitted past said head flows through the longitudinal passage to said working space, the thrust member having its end which projects into said working space formed into a recess which provides a valve seat for the end of the valve stem opposite from said poppet valve head, the valve stem dividing the recess into an inner portion which is in permanent communication with the working space in said one end of the cylinder and an outer portion in permanent communication with the exhaust port.

3. A liquid pressure servo-motor comprising a cylinder, a plunger movable in the cylinder and normally urged toward one end thereof and dividing the same into two working spaces one at each end of the cylinder, said plunger having a valve chamber therein, a valve device disposed in the valve chamber, an inlet port having a connection to said valve chamber which is normally closed to the inlet port by said valve device, an exhaust port having a passageway communicating with the working space in one end of the cylinder, said valve device including a valve member constituted to be hydraulically balanced at all times with respect to inlet pressure acting upon it and constructed and arranged to be moved in a direction to open said normally closed connection to said valve chamber to admit inlet pressure thereto and to said one end of the cylinder to move the plunger toward the other end of the cylinder, a thrust member having one end projecting into the working space in said one end of the cylinder and movable axially relative to the plunger and constructed and arranged to engage said valve member to move the same to open the valve chamber to inlet pressure and to close said exhaust port passageway to cut off communication between said one end of the cylinder and said exhaust port, said thrust member and plunger constructed and arranged to have areas exposed to the working space in said one end of the cylinder in such relationship that the total pressure acting on the effective area of the thrust member tending to move it in one direction is only a fraction of but proportional to the total pressure acting on the effective area of the plunger tending to move it in the opposite direction toward said other end of the cylinder, said valve member comprising a poppet valve head with a valve stem having a longitudinal passage therein extending from end to end to thereby connect said valve chamber to the working space in said one end of the cylinder, the valve member being disposed with the poppet valve head pointing away from the working space in said one end of the cylinder so that the pressure liquid admitted past said head flows through the longitudinal passage to said working space, the thrust member having its end which projects into said working space formed into a frusto-conical recess which provides a valve seat for the end of the valve stem opposite from said poppet valve head, the valve stem dividing the recess into an inner portion which is in permanent communication with the working space in said one end of the cylinder and an outer portion in permanent communication with the exhaust port.

LESLIE CYRIL CHOUINGS.

Certificate of Correction

Patent No. 2,410,269.  October 29, 1946.

LESLIE CYRIL CHOUINGS

It is hereby certified that error appears in the printed specification of the above numbered patent requiring correction as follows: Column 4, line 24, for the word "spigot" read *reduced diameter*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*